2,780,737
VAPOR COOLED GENERATOR

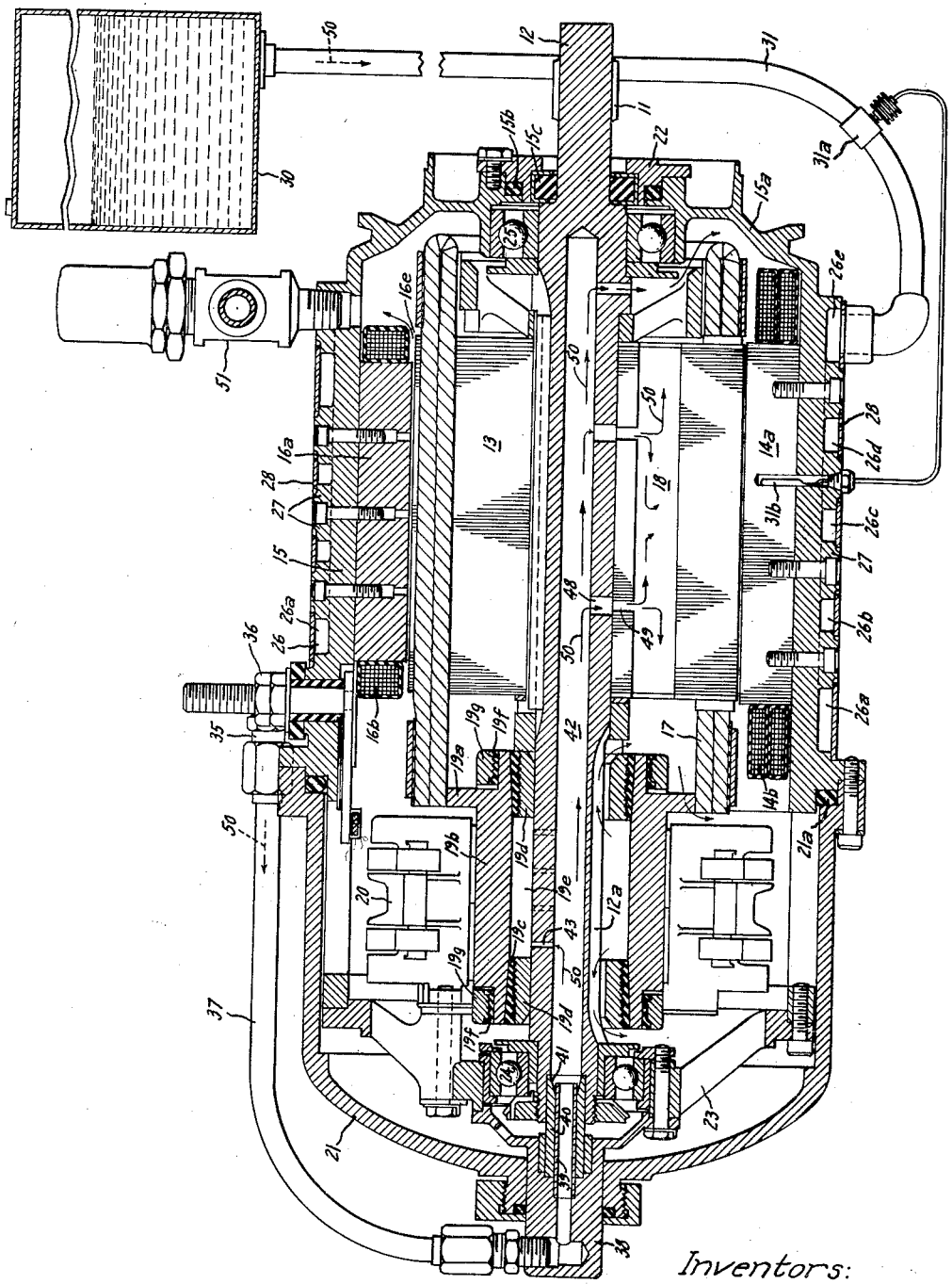

Albert H. Labastie, Medford, and John W. Poole, East Lynn, Mass., assignors to General Electric Company, a corporation of New York Application March 21, 1955, Serial No. 495,642

6 Claims. (Cl. 310—54)

This invention relates to dynamoelectric machines and has particular significance in connection with improved arrangements for more efficiently cooling such machines, particularly when used as generators in high flying aircraft.

Heretofore, electric systems of airplanes adapted for high altitude operation have presented vexatious problems because the high speed of aircraft in the lower air densities existing at high altitudes raises the temperature of the ram air so high that it is not useful for the effective cooling of high capacity dynamoelectric machines. Heating is not so serious in the case of most electric motors used in aircraft because they operate only intermittently, but is a considerable problem in connection with the principal generator of the system since it must operate continually and usually under load conditions.

In Patent 2,606,946, issued August 12, 1952, on an application filed by Alec Fisher and assigned to the assignee of the present invention, the use of a suitable liquid coolant circulated through the interior of the machine and an external intercooler with means provided to pump out a major portion of the fluid adjacent commutator and brushes was disclosed, and while this is satisfactory in many applications, the added weight of the requisite cooling liquid and intercooler, and with turbulence as well as the increased "windage" losses make it less satisfactory in other applications.

It is an object of the present invention to provide simple and inexpensive means for overcoming the abovementioned difficulties.

A further object is to provide an aircraft generator cooled by liquid passed through metering orifices so as to utilize the latent heat of vaporization and assure uniform maximum cooling while using a minimum of liquid.

Other objects and advantages will become apparent and the invention will be better understood from consideration of the following description taken in connection with the accompanying drawing in which:

The single figure is an elevational view in section and of a totally enclosed aircraft generator with means to provide adequate cooling and brush protection at substantially any altitude.

Broadly, the means employed in the embodiment herein described for cooling an aircraft generator comprises an outer cooling fluid jacket through which the liquid flows to cool the stator, an inner hollow shaft through which fluid from the jacket flows having radial metering passages from the shaft bore to a space under the commutator segments into axial passages provided through the rotor core, with the various passages constructed and arranged to meter the liquid into the cooling spaces of the rotor where the heat of vaporization of the liquid uniformly cools the rotor. The rotor cooling spaces are in communication with the stator cavity and a pressure relief valve provides for the escape of the vapor from the machine and maintains a constant pressure in the machine to provide a constant boiling point for the liquid.

In the drawing there is shown an aircraft generator adapted to be driven by an aircraft engine through a splined end 11 of a generator shaft 12. Shaft 12 drives a laminated rotor core 13, which is arranged to react electrodynamically with a stator core comprising field poles 14a joined by an outer annular frame or yoke 15. Field excitation is supplied through a main field winding 14b on poles 14a and the rotor 13 is provided with a conventional armature winding 17 and axially extending rotor core ventilating passages 18 provided in the punchings. The armature winding 17 is connected at tapped intervals through ears 19a to the individual commutator segments 19b mounted on insulating rings 19c. Rings 19c in turn are mounted on metal support cones 19d which are keyed to be driven by the shaft 12 while axially spaced from each other to provide an annular chamber 19e between segments and shaft. If desired the shaft may be splined (as at 12a) beneath the support cones 19d to provide openings under these rings for escaping vapor which, as hereafter described, is introduced to or generated in annular chamber 19e. Insulating ring 19f surrounds reduced diameter ends of the segments and is held in place by metallic shrink rings 19g. Preferably commutator ears or risers 19a are peripherally spaced from each other so that cooling and commutator lubricating vapor may flow therebetween and thence over the commutator between the brush sets indicated at 20.

As shown, the machine is provided with commutating poles 16a provided with windings 16b, whilst the main poles 14a carry the main windings 14b. A space 16e is provided between the main field windings 14b and the compensating windings 16b to allow for passing of cooling medium therebetween as hereafter more fully explained.

The entire machine is arranged to be substantially liquid tight and to this end it is provided with a substantially solid commutator end access cover 21 sealed with respect to yoke 15 by rubber O ring 21a, and a substantially solid front end flange 15a shown as an integral part of yoke 15 and sealed with respect to shaft 12 by seal rings 15b and 15c which are held in compression by cap 22. Also shown in Fig. 1 is a commutator end support spider 23 which, with end flange 15a, provides bearing hubs for receiving conventional antifriction bearings 24 and 25, respectively, which in turn support the shaft 12 on which the rotor core and commutator are mounted to rotate.

As thus far described, the arrangement is somewhat conventional. In order to cool the machine, an outer water jacket is formed by providing a volumetric chamber 26 around the outer periphery of the yoke or frame 15. This space is interrupted by projecting pads 27 which accommodate bolts holding the poles in place. Pads 27 also serve for attaching plates 28 which are welded thereto so that volumetric chamber 26 is fluid tight. The volumetric chamber 26 thus formed may be thought of as a water jacket containing islands which provide means for bolting the stator poles thereto as well as producing turbulent eddies for improving heat transfer.

It is to be noted that this generator is designed to operate in an airplane without the benefit of coling air, and while it does require that a liquid reservoir 30 be provided on the ship, this reservoir 30 may be small. Because the heat of vaporization of the liquid is utilized, the total rate of flow of coolant is only about 1/80 as much as if the machine were liquid cooled. From the reservoir 30 the water (or other liquid) is conducted into the bottom of the machine frame water jacket through a tube 31 from whence it passes around the chamber 26, eventually arriving at the top of the machine at the opposite end of the rotor and stator core members. The water then passes out of chamber 26 through a nipple 35.

From the nipple 35 the water is conducted through tubing 37 into a stationary hub 38 on commutator access cover 21. A pipe 39, pressed into hub 38, projects axially into rotating shaft 12. A larger pipe 40 surrounding pipe 39 is pressed into rotating shaft 12 and overlaps pipe 39 with a close running fit. At its discharge end pipe 40 communicates with bore 42 of shaft 12 and is provided with a funnel-like mouth 41 to create a low pressure at this point to diminish any tendency for back leakage between pipes 39 and 40. As the water passes bearing 24, it cools bearing 24 by conduction through the wall of shaft 12. Bore 42 communicates through radial metering passages 43 with the annular space 19e at inner diameter of the commutator segments. Additional radial metering passages 48 communicate through the shaft between its bore 42 and radial passages 49 partially through the punchings and communicating with the axial passages 18 provided in the rotor core. The bore 42 extends to a position radially inwardly of bearing 25 so that bearing 25 is cooled by conduction through the wall of shaft 12. While the bore 42 of shaft 12 is normally not filled with liquid, the centrifugal force causes the liquid to distribute itself evenly on the inner surface of the shaft.

With the arrangement of the invention, the radial holes 43 and 48 in the shaft meter the mater to the chamber 19e at the inside of the commutator and to the axial holes 18 in the rotor core. The metered liquid coming in contact with the hot surfaces of the commutator and the rotor core which operate at approximately 100° C. changes to vapor rapidly, thus absorbing the generator heat. The dimensions of the metering passages 43 and 48 are selected so that the cooling fluid which takes the paths shown by arrows 50 flows into commutator cooling space 19e and axial rotor ducts 18 in accordance with the heat generated therein. Tests have been made to determine the heat generated in various parts of the rotor and it has been found that a uniform temperature of all parts of the rotor can be maintained in accordance with this invention if approximately ⅓ of the total cooling liquid passes into commutator cooling space 19e and ⅔ passes into the axial rotor ducts 18.

The vapor then passes into the stator cavity, as indicated by the arrows, and may pass out of the machine by leakage or preferably through a pressure relief valve 51 so that a constant pressure, of say ½ to 1 p. s. i. above sea level pressure, is maintained in the machine and the temperature at which the vaporization of the liquid takes place will remain constant for uniform cooling.

Since the generator may be used under varying load conditions during operation, it is apparent that it is desirable to provide means for controlling the rate of flow of cooling liquid from reservoir 30 in response to the temperature of the generator. As shown, a valve 31a having a variable opening is controlled in the usual manner by a temperature responsive bulb 31b which is inserted into stator core 14a. In this way the amount of liquid flowing from the reservoir will be increased upon an increase in the temperature of the stator core above a prescribed limit.

Because a cooling arrangement is provided wherein the heat of vaporization of a liquid is utilized, this invention assures:

1. That the windings, commutators, brushes and other electric parts will not be saturated with liquid and thus be subject to short circuit;
2. That more than 500 times the amount of heat will be extracted for a given quantity of water as compared with merely raising the heat of the same quantity of fluid 1° C.;
3. That "windage" will be substantially reduced;
4. That proper humidity and pressure conditions will be supplied to commutator and brushes to prevent brush dusting at high altitude;
5. That external air is not depended upon at all (thus the machine is "environment free");
6. That the weight of the air borne equipment is reduced to a minimum.

Moreover, because of the exceptional effectiveness of the heat transfer arrangement of this invention due to the extreme amount of heat which can be extracted from a small surface area as a result of the vaporization of the liquid thereon, the output of the machine can be increased 50% for continuous duty operation and can be doubled for periods of more than one hour without serious damage to the electrical or mechanical components of the machine. Consequently, this invention is particularly useful where high outputs and light weight are design requirements, as well as where emergency or short term use at much more than the normal output requirements are sometimes needed.

While there has been illustrated and described a particular embodiment, various modifications may obviously be made without departing from the true spirit and scope of the invention as defined in the appended claims.

What is claimed as new and desired to be secured by Letters Patent of the United States is:

1. A dynamoelectric machine comprising a stator member providing shaft supporting bearings, a rotor member having a hollow shaft provided with openings through the wall thereof mounted for rotation on said bearings, said stator member providing a cooling chamber, said rotor member providing an enlarged vaporization chamber in communication with said hollow shaft through said openings, tube means connected to said stator cooling chamber for delivering a liquid thereto to cool said stator, means connecting said stator cooling chamber to said hollow shaft for delivery of the liquid thereto for causing the liquid upon rotation of the shaft to form a film covering the inner wall of said hollow shaft to cool the bearings by conduction and to meter the liquid through said openings into said vaporization chamber to cause the liquid to be vaporized by contacting the walls of said vaporization chamber to cool the rotor.

2. A dynamoelectric machine as recited in claim 1, including a regulating valve in said tube means automatically operable to regulate the amount of liquid entering the machine in response to the temperature of the motor.

3. In a dynamoelectric machine having a stator member, a frame providing a cooling chamber for said stator member, a rotor for cooperating electrodynamically with the stator member and provided with a vaporization chamber, and a hollow rotor shaft having openings in the wall thereof communicating with said vaporization chamber and being supported for rotation on bearings in said frame, the combination of a source of liquid, means connecting said source of liquid to said cooling chamber for cooling the stator member and for preheating the liquid, means connecting said cooling chamber to said hollow shaft to supply liquid thereto for causing the liquid upon rotation of the shaft to form a film covering the inner wall of said hollow shaft to cool the bearings uniformly by conduction, said openings serving to meter the liquid into said vaporization chamber to cause the liquid to vaporize upon contact with the walls of said chamber to cool the rotor.

4. In a dynamoelectric machine having a stator member having bearings and a rotor member comprising a rotor core and a commutator mounted on a hollow shaft for rotation on said bearings, said rotor core and said commutator each providing an enlarged vaporization chamber, said hollow shaft having a plurality of openings in the walls thereof to provide communication with each of said vaporization chambers, a source of liquid, means connecting said source of liquid to said hollow shaft to provide liquid thereto for causing the liquid upon rotation of said shaft to form a film completely covering the inner wall of said hollow shaft to cool the bearings uniformly by conduction, said openings in said hollow shaft serving to distribute and meter the liquid into said vaporization chambers to cause the liquid to vaporize upon contact with the walls of said chambers to cool the rotor core and the commutator.

5. A dynamoelectric machine having a frame providing an enclosed stator cavity, a stator mounted in said cavity, a rotor member mounted for rotation on a hollow shaft having openings in the wall thereof, said rotor member being provided with an enlarged vaporization chamber in communication with said hollow shaft through said openings, means for delivering a liquid coolant to said hollow shaft to cause the liquid upon rotation of said shaft to form a film covering the inner wall of said hollow shaft, said openings serving to meter the liquid into said vaporization chamber to cause the liquid to vaporize upon contact with the walls of said chamber to cool said rotor, and communication means between said vaporization chamber and said stator cavity to provide for the passage of the vapor into the stator cavity.

6. A dynamoelectric machine as recited in claim 5, wherein a pressure relief valve in communication with said stator cavity is provided to regulate the discharge of the vapor from said stator cavity to maintain a constant vapor pressure therein.

References Cited in the file of this patent

UNITED STATES PATENTS

| 1,121,014 | Hobart | Dec. 15, 1914 |

FOREIGN PATENTS

| 165,383 | Great Britain | June 30, 1921 |